United States Patent
Kadadi et al.

(10) Patent No.: US 11,856,420 B2
(45) Date of Patent: Dec. 26, 2023

(54) PREDICTION AND ESTIMATION OF MOBILITY METRIC FOR RADIO ACCESS NETWORK OPTIMIZATION

(71) Applicant: Nokia Solutions and Networks Oy, Espoo (FI)

(72) Inventors: Shivanand Kadadi, Bangalore (IN); Parijat Bhattacharjee, Bangalore (IN); Vaibhav Singh, New Dehli (IN)

(73) Assignee: Nokia Solutions and Networks Oy, Espoo (FI)

( * ) Notice: Subject to any disclaimer, the term of this patent is extended or adjusted under 35 U.S.C. 154(b) by 332 days.

(21) Appl. No.: 17/426,957

(22) PCT Filed: Feb. 13, 2019

(86) PCT No.: PCT/EP2019/053592
§ 371 (c)(1),
(2) Date: Jul. 29, 2021

(87) PCT Pub. No.: WO2020/160790
PCT Pub. Date: Aug. 13, 2020

(65) Prior Publication Data
US 2022/0110007 A1    Apr. 7, 2022

(30) Foreign Application Priority Data
Feb. 4, 2019 (IN) .............................. 201911004362

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC .............................. H04W 24/02; H04W 24/08
(Continued)

(56) References Cited

U.S. PATENT DOCUMENTS

| 8,965,336 | B1* | 2/2015 | Murff ................. H04W 64/006 455/457 |
| 2015/0045028 | A1 | 2/2015 | Singh et al. |

(Continued)

FOREIGN PATENT DOCUMENTS

| CN | 105052191 A | 11/2015 |
| CN | 105794255 A | 7/2016 |

(Continued)

OTHER PUBLICATIONS

3GPP TS 23.288 (V0.1.0 (Feb. 2019), $3^{rd}$ Generation Partnership Project; Technical Specification Group Services and System Aspects; Architecture enhancements for 5G System (5GS) to support network data analytics services; (Release 16), 40 pgs.

(Continued)

*Primary Examiner* — Christopher R Crompton
(74) *Attorney, Agent, or Firm* — Harrington & Smith

(57) ABSTRACT

A method and apparatus for estimating and/or predicting mobility metric(s) for RAN optimization. One method includes receiving a request, from at least one RAN optimization service, to provide an estimate or prediction of a mobility metric for at least one UE or group of UEs or at least one cell. The request may include attributes describing characteristics of the mobility metric. The method may then include communicating with a RAN node to request data about the at least one UE or the group of UEs or the at least one cell associated with the request, receiving the requested data, and calculating the estimate or the prediction of the mobility metric using the requested data and based on the attributes received in the request from the at least one RAN optimization service.

20 Claims, 11 Drawing Sheets

(58) Field of Classification Search
USPC .......................................................... 370/252
See application file for complete search history.

(56) References Cited

U.S. PATENT DOCUMENTS

2017/0332302 A1  11/2017  Ercan et al.
2017/0332303 A1  11/2017  Sunay et al.
2018/0262924 A1   9/2018  Dao et al.

FOREIGN PATENT DOCUMENTS

| CN | 107409315 A | 11/2017 |
| CN | 108293198 A | 7/2018 |
| CN | 109104746 A | 12/2018 |
| WO | WO-2013/072271 A1 | 5/2013 |
| WO | WO-2017/153867 A2 | 9/2017 |

OTHER PUBLICATIONS

3GPP TSG RAN Meeting #80, La Jolla, USA, Jun. 11-14, 2018, RP-181456, "New Study Item proposal: RAN-centric Data Collection and Utilization for NR", CMCC, 6 pgs.
SA WG2 Meeting #126, Feb. 26-Mar. 2, 2018, Montreal, Canada, S2-181517, "Discussion on use cases of mobility management optimization", CATT, 4 pgs.
3GPP TSG-SA WG2 Meeting #128bis, Aug. 20-24, 2018, Sophia, Antipolis, France, S2-188198, "Solution for overload avoidance with the help of NWDAF output", CATT, 2 pgs.
3GPP TSG-SA WG2 Meeting #130, Jan. 21-25, 2019, Kochi, India, S2-1900534, "TS 23.288: General Framework for 5G Network Automation", China Mobile, 4 pgs.
Vodafone Group: "General Requirements of RAN-Centric Data Collection and Utilization for LTE and NR", Sections 3.7., 10 pgs.
ZTE "Update to the Solution 10 for Key Issue 9: Customizing Mobiiity Management Based on NWDAF Output" SA WG2 Meetin #129bis. S2-1812442. Nov. 26-30, 2018.

* cited by examiner

PREDICTION AND ESTIMATION OF MOBILITY METRIC FOR RADIO ACCESS NETWORK OPTIMIZATION

CROSS REFERENCE TO RELATED APPLICATION

This patent application is a U.S. National Stage application of International Patent Application Number PCT/EP2019/053592 filed Feb. 13, 2019, which is hereby incorporated by reference in its entirety, and claims priority to IN 201911004362 filed Feb. 4, 2019.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for predicting or estimating mobility metric(s) for radio access network (RAN) optimization.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

One embodiment is directed to a method, which may include receiving a request, from at least one radio access network optimization service, to provide an estimate or prediction of a mobility metric for at least one user equipment or a group of user equipment (UEs) or at least one cell, the request comprising attributes describing characteristics of the mobility metric. The method may also include communicating with a radio access network node, via a controller platform, to request data about the at least one user equipment or the group of UEs or the at least one cell associated with the request, receiving the requested data about the at least one user equipment or the group of UEs or the at least one cell associated with the request, and calculating the estimate or the prediction of the mobility metric using the requested data and based on the attributes received in the request from the at least one radio access network optimization service.

Another embodiment is directed to apparatus including at least one processor and at least one memory comprising computer program code. The at least one memory and computer program code configured, with the at least one processor, to cause the apparatus at least to receive a request, from at least one radio access network optimization service, to provide an estimate or prediction of a mobility metric for at least one user equipment or group of user equipment (UEs) or at least one cell, the request comprising attributes describing characteristics of the mobility metric, to communicate with a radio access network node, via a controller platform, to request data about the at least one user equipment or the group of UEs or the at least one cell associated with the request, to receive the requested data about the at least one user equipment or the group of UEs or the at least one cell associated with the request, and to calculate the estimate or the prediction of the mobility metric using the requested data and based on the attributes received in the request from the at least one radio access network optimization service.

Another embodiment is directed to an apparatus including means for receiving a request, from at least one radio access network optimization service, to provide an estimate or prediction of a mobility metric for at least one user equipment or group of user equipment (UEs) or at least one cell, the request comprising attributes describing characteristics of the mobility metric, means for communicating with a radio access network node, via a controller platform, to request data about the at least one user equipment or the group of UEs or the at least one cell associated with the request, means for receiving the requested data about the at least one user equipment or the group of UEs or the at least one cell associated with the request, and means for calculating the estimate or the prediction of the mobility metric using the requested data and based on the attributes received in the request from the at least one radio access network optimization service.

Another embodiment is directed to an apparatus including circuitry configured to receive a request, from at least one radio access network optimization service, to provide an estimate or prediction of a mobility metric for at least one user equipment or a group of user equipment (UEs) or at least one cell, the request comprising attributes describing characteristics of the mobility metric, circuitry configured to communicate with a radio access network node, via a controller platform, to request data about the at least one user equipment or the group of UEs or the at least one cell associated with the request, circuitry configured to receive the requested data about the at least one user equipment or the group of UEs or the at least one cell associated with the request, and circuitry configured to calculate the estimate or the prediction of the mobility metric using the requested data and based on the attributes received in the request from the at least one radio access network optimization service.

Another embodiment is directed to a non-transitory computer readable medium comprising program instructions stored thereon for performing at least the following: receiving a request, from at least one radio access network optimization service, to provide an estimate or prediction of a mobility metric for at least one user equipment or a group of user equipment (UEs) or at least one cell, the request comprising attributes describing characteristics of the mobility metric; communicating with a radio access network node, via a controller platform, to request data about the at least one user equipment or the group of UEs or the at least one cell associated with the request; receiving the requested data about the at least one user equipment or the group of UEs or the at least one cell associated with the request; and calculating the estimate or the prediction of the mobility metric using the requested data and based on the attributes received in the request from the at least one radio access network optimization service.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for estimating and/or predicting mobility metric(s) for RAN optimization, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Some example embodiments may relate to an architecture being developed based on open application programming interfaces (APIs) that will allow radio resource management (RRM) algorithms and RAN optimization algorithms to be hosted on an open platform so as to interact with and guide the behavior of the RAN. This architecture may be referred to as extensible RAN (xRAN) controller or Radio Intelligent Controller (RIC) or other naming convention.

Figure 1:
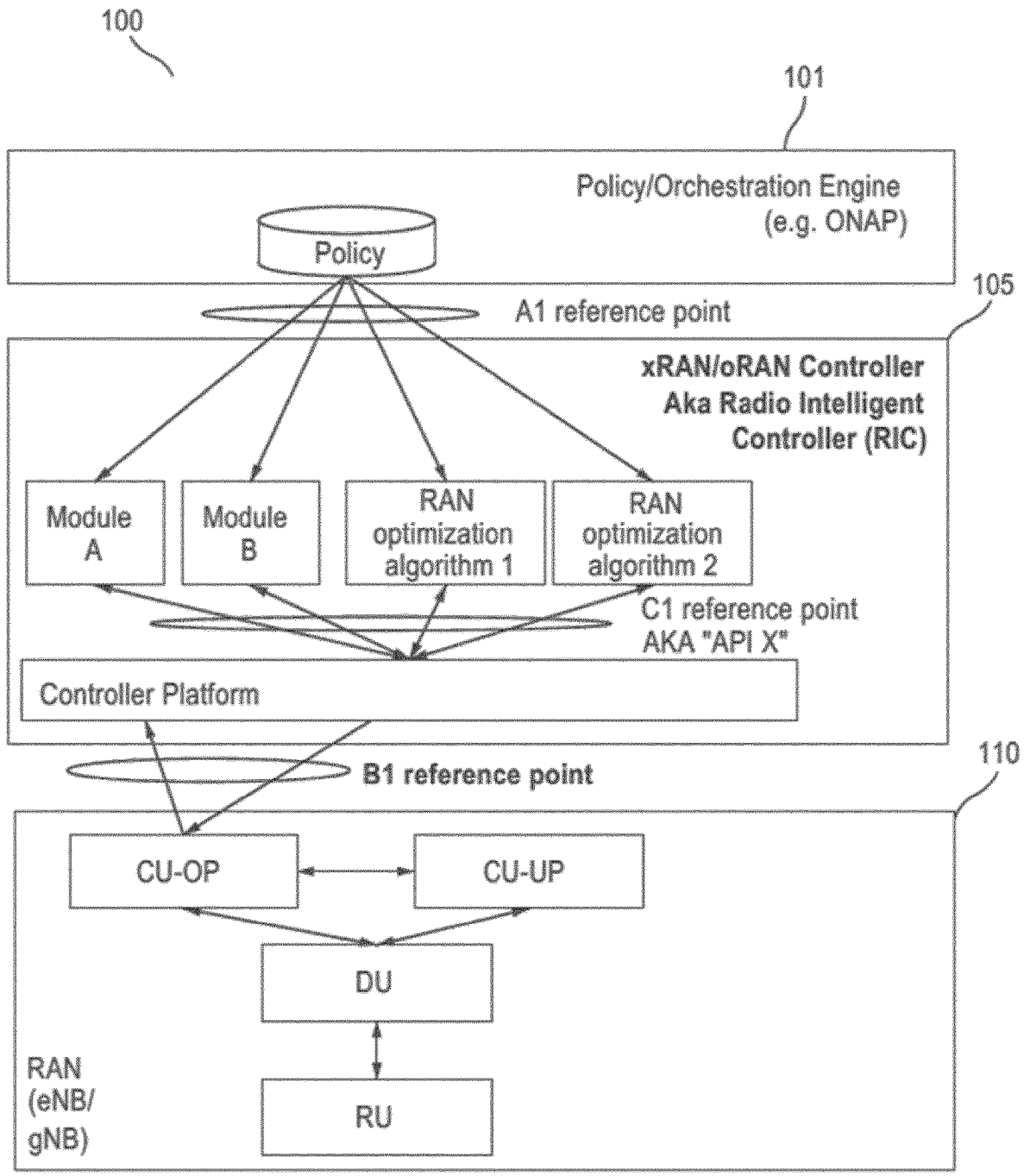
FIG. 1 illustrates an example system diagram depicting an example of an xRAN architecture, according to an embodiment.

FIG. 1 illustrates an example system diagram depicting an example of an xRAN architecture 100, according to one example embodiment. As illustrated in the example of FIG. 1, the system 100 may include a policy and orchestration engine 101 that can interact with an xRAN controller/RIC 105 via an A1 reference point.

As also illustrated in the example of FIG. 1, one aspect of the architecture of the xRAN controller/RIC 105 is that the various RRM/optimization algorithms may be instantiated as services on top of an underlying controller platform. The services can interact with the platform by means of an "API X," which is also sometimes referred to as reference point "C1." This allows the xRAN controller/RIC 105 to be an open platform that can host an ecosystem of applications.

As further illustrated in the example of FIG. 1, the underlying RIC platform may provide the ability to interface to the RAN 110 by means of a reference point or interface B1 (also sometimes known as E2), in order to receive information from the RAN 110 and/or to communicate information or control actions to the RAN 110. The RIC/controller platform can provide various underlying facilities, such as analytics and machine learning (ML) that may be used by various RAN optimization algorithms residing on top of the RIC platform.

Example embodiments described herein may provide an approach in which some of these services instantiated on the controller platform may be common programmable modules that can be invoked by multiple RRM/Optimization Algorithms. That is, these modules may be considered as common building blocks in the operation of multiple of the RRM/Optimization Algorithms.

An example embodiment provides one such module and a programmable API that may allow the module to suitably interact with multiple such RRM/Optimization algorithms or services. According to an example embodiment, in the xRAN or open RAN (oRAN) architecture, the module's API may map to API X/reference point C1. More generally, the module may be embedded inside a network node or base station, such as an eNB or gNB. In this case, optimization algorithm applications may interact with the module via APIs towards the base station that allow interaction with the module.

Multiple RRM or RAN optimization algorithms could be instantiated as services on a controller platform, such as xRAN controller or RIC. For example, these optimization algorithms may include channel quality indicator (CQI) or physical uplink control channel (PUCCH) optimization, inter-frequency load-balancing, admission control optimization, carrier aggregation S-cell selection, etc. The algorithms try to optimize the performance of the RAN, for example by adapting various settings, thresholds, or calculation of certain metrics.

Many of these algorithms take into account various characteristics of the cells, and the conditions within the cell or in a neighborhood of the cell. One such characteristic that may be used by many algorithms is the mobility characteristics of UEs under a cell or group of cells. A component of the RRM/optimization algorithms is that they have knowledge of an estimate or prediction of a mobility metric or measure of mobility in one or more cells.

Here, a mobility metric can include, but is not limited to, UE speed, channel coherence time (which is related to speed), sojourn time of a UE in a cell, rate of (or average time between) handovers, etc. These metrics can be on a per-UE level, or an aggregate/composite (e.g., average) metric for a cell or one or more cells. However, if each RRM/Optimization algorithm were to generate its own mobility metric estimate/prediction according to its own needs, all of the underlying data of the cell would need to be provided to each RRM/algorithm. This would result in excessive and/or duplicated computation, which may involve excessive duplication of the data, leading to large data movement and storage costs in addition to increased processing load.

Therefore, as will be discussed in detail in the following, example embodiments provide a method and/or apparatus, which may include a module or unit, for allowing different RRM/Optimization algorithms or services to be able to obtain a measure of mobility with the right characteristics as needed by that algorithm, while minimizing data duplication and processor overhead, in a manner that is suitable to implement over a controller platform such as a radio intelligent controller.

Figure 2:
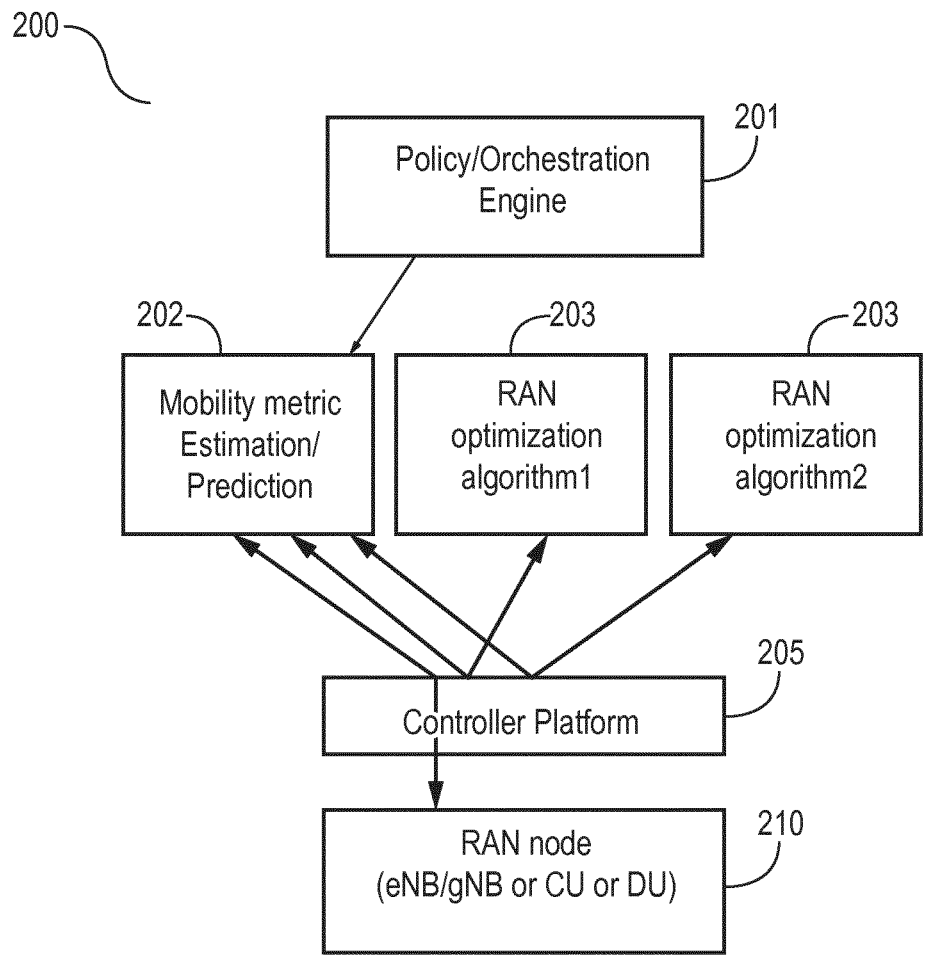
FIG. 2 illustrates an example system diagram depicting an example of an xRAN architecture, according to an embodiment.

FIG. 2 illustrates an example system diagram depicting an example of an xRAN architecture 200, according to some example embodiments. As illustrated in the example of FIG. 2, certain embodiments provide a mobility metric estimation/prediction module 202 that can be hosted on a controller platform 205 which may also support other RRM algorithm modules 203 and an interface to RAN node(s) 210. According to some embodiments, the mobility metric estimation/prediction module 202 may be configured to receive, for example via an API, a request from a RAN/RRM optimization service to provide an estimate of a mobility metric (either at a per-UE level or cell-level). In one example, the request received from the RAN/RRM optimization service may also include additional attributes describing the characteristics of the requested mobility estimate.

The additional attributes may include, for instance, a type of mobility metric, a granularity of mobility metric estimate, a type of report (e.g., average or confidence bounds), whether the request is for estimate or future prediction, and/or a time interval over which the estimate/prediction should be valid. The type of mobility metric may include one or more of the speed of a UE in the cell, the channel coherence time or sojourn time of the UE in a cell, and/or rate of (or average time between) handovers. The granularity of mobility metric estimate may include one or more of a per-UE mobility metric or aggregated mobility metric (dominant mobility metric components, size of mobility metric buckets). As mentioned above, these attributes can be on a per-UE level or an aggregate/composite (e.g., average) metric for a cell or one or more cells.

In an embodiment, the mobility metric estimation/prediction module 202 may also be configured to communicate with a RAN node 210 via the controller platform 205 to request data about one or more UEs and/or one or more cells. For example, the requested data may include UE channel quality indicator (CQI) values, a measure of rate of variation of channel conditions of a UE (e.g., level crossing rate or shadow-fading decorrelation distance/time etc.), and/or speed calculated at a RAN node (e.g., calculated using doppler at physical layer).

According to an embodiment, the mobility metric estimation/prediction module 202 may also be configured to receive the requested data about the one or more UEs and/or one or more cells from the RAN node 210 via the controller platform 205. In one example, the mobility metric estimation/prediction module 202 may then be configured to calculate a mobility metric estimate and/or prediction based on the attributes provided by the requesting RAN/RRM optimization service.

In an embodiment, the mobility metric estimation/prediction module 202 may also be configured to report the calculated mobility metric estimate/prediction to the requesting RAN/RRM optimization service, for example, via an API. According to certain embodiments, the reported value(s) may include one or more of: mobility metric estimate/prediction for individual UE(s); mobility metrics for a cell that may be suitably averaged or aggregated across all UEs; classification of one or more UEs into multiple mobility metric classes or buckets, such as based on high/medium/low values of the mobility metric; dominant (e.g., maximum or most prevalent) mobility metric values in a cell; and/or an upper/lower range or confidence bounds for the mobility metric values.

In addition, according to some examples, the mobility metric estimation/prediction module 202 may also be configured to support an API to allow a RAN/RRM optimization service to discover the identity or address of the mobility prediction and estimation modules and the service they provide. In an embodiment, the mobility metric estimation/prediction module 202 may be further configured to receive, e.g., via a policy API, an indication from a policy/orchestration engine 201 describing policies to be applied to mobility calculations and requests from RAN/RRM optimization algorithms. The indication received from the policy/orchestration engine 201 may include, for example, indications of which cells are to be handled by the mobility metric estimation/prediction module 202, indications of which services/algorithms are allowed to request mobility metric estimations or predictions, biasing factors for certain cells/carriers, type of data each cell is providing (LCR, Shadow fading parameters or velocity estimated at RAN, e.g., using Doppler at physical layer), and/or a functionality split of the mobility metric prediction/estimation module 202 for each cell and method of mobility estimation.

Figure 3:
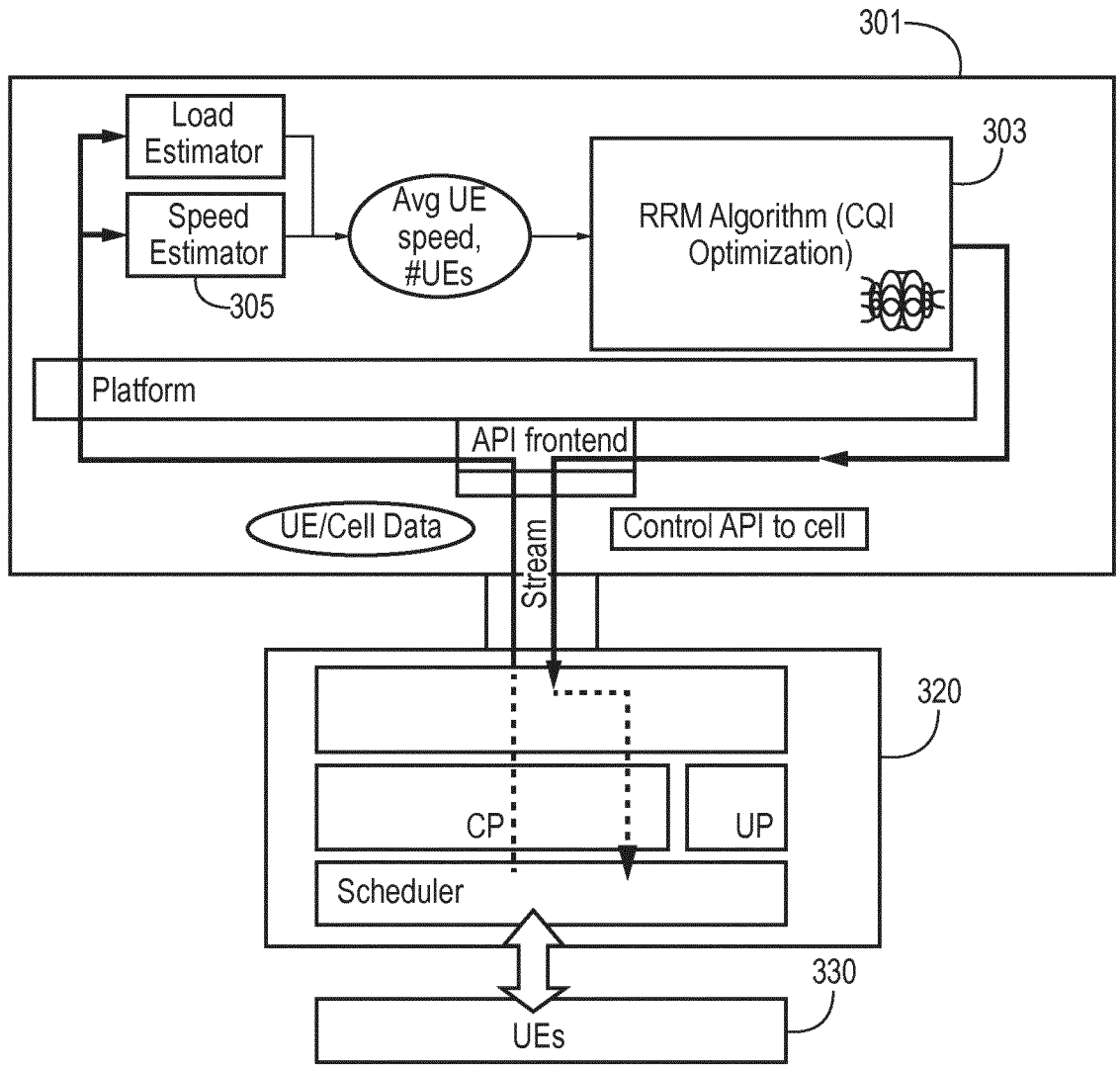
FIG. 3 illustrates an example block diagram of a system, according to another embodiment.

FIG. 3 illustrates an example block diagram of a system including a mobility prediction/estimation module (MPEM) 301, a base station 320 and UE(s) 330, according to some example embodiments. In the example of FIG. 3, the MPEM 301 may implement a CQI optimization module 303 for speed estimation, according to one embodiment. As illustrated in the example of FIG. 3, the CQI optimization module 303 may interact with a speed estimation module 305 to obtain an estimate of average UE speed in the cell.

According to certain embodiments, the speed estimation module 305 may be configured to obtain data related to UEs 330 in a certain cell. For example, in an embodiment, eNB 320 may calculate related metrics and send them to the speed estimator module 305. The speed estimator module 305 may then be configured to produce an estimate of the average UE speed in the cell and report that to the CQI optimization module 303.

Figure 4A:
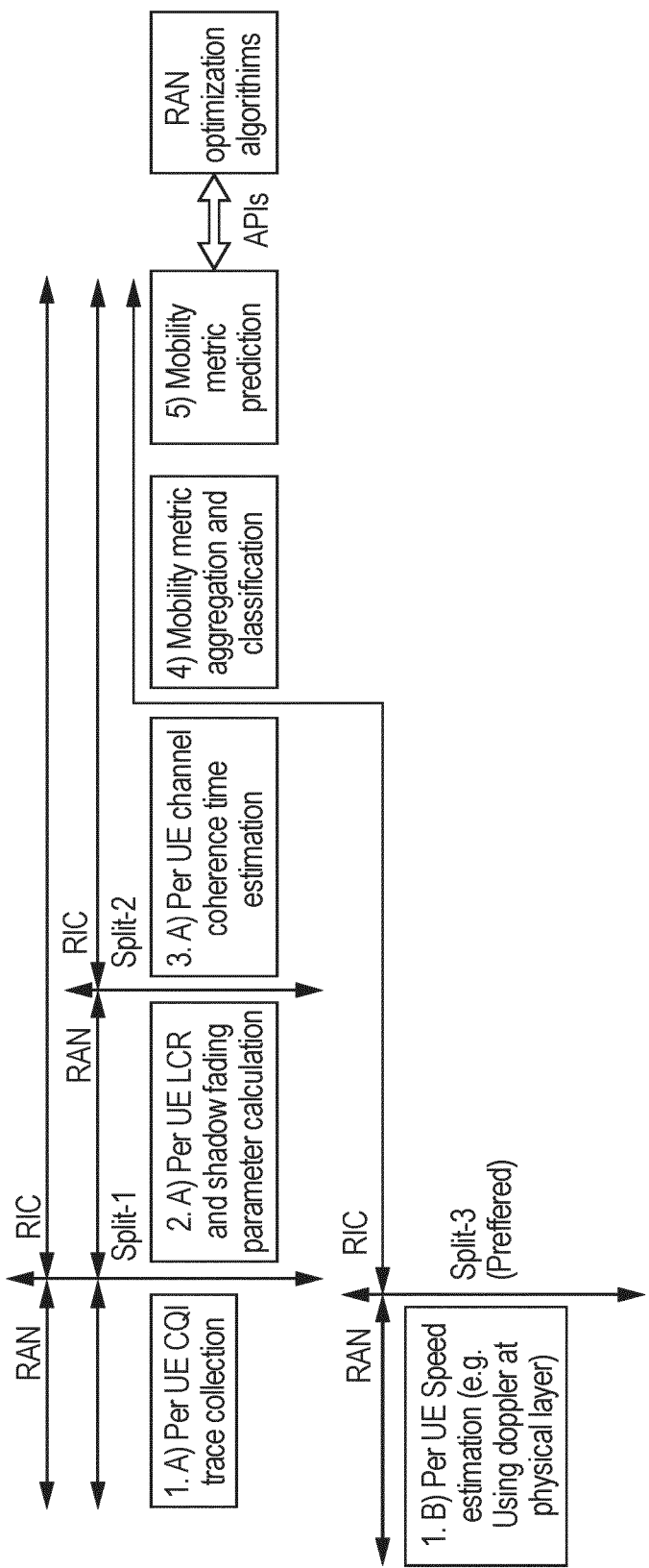
FIG. 4a illustrate an example block diagram depicting a MPEM functionality split between a RAN and RIC, according to an embodiment.
Figure 4B:
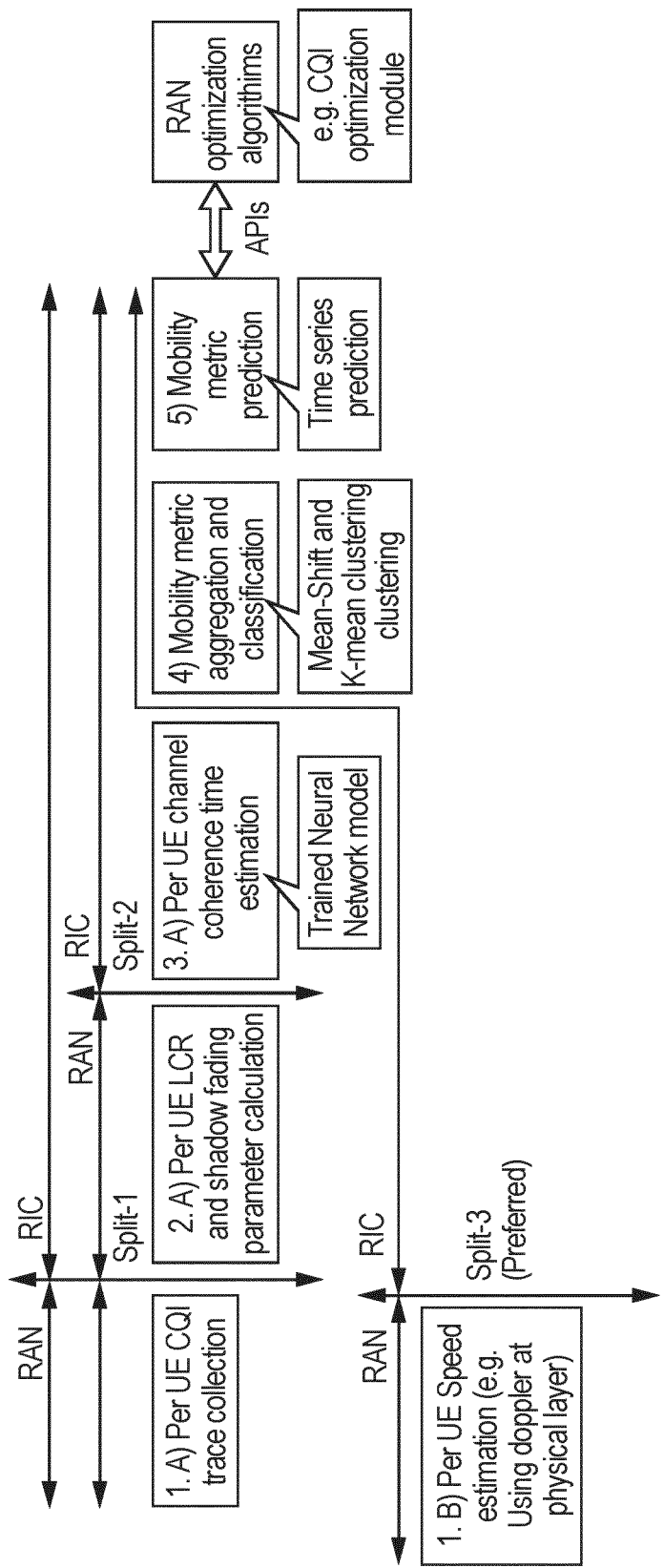
FIG. 4b illustrates an example of a MPEM functionality split in which AI/ML approaches are used, according to one embodiment.

FIGS. 4a and 4b illustrate an example block diagram depicting a MPEM functionality split between a RAN and RIC, according to some example embodiments. According to example embodiments, the exact information exchanged between the RAN and RIC may depend on the "functional split" of the MPEM between RAN and RIC. FIGS. 4a and 4b illustrate an example of a generic reference model of the MPEM functionality. As illustrated in the examples of FIGS. 4a and 4b, different splits of functionality between RAN and RIC are possible, for example Split 1, Split 2, Split 3. It is noted, however, that other splits are also possible.

According to certain embodiments, the information exchanged (and message flow) between the RIC and the controller may depend on the functional split. For example, in Split 1, the RAN sends per UE level crossing rate (LCR) and shadow fading parameters, and the RIC performs per UE channel coherence time estimation and above. According to this example, in Split 2, the RAN sends per UE CQI traces to the RIC, and the RIC performs per UE LCR and shadow fading parameter calculation and above. Further according to this example, in Split 3, the RAN performs per UE speed estimation, e.g., using doppler at physical layer and sends estimated per UE speed to the RIC. The RIC performs mobility metric aggregation and above.

In some example embodiments, the exact functional split to be used may be dynamically negotiated between the RAN and the RIC taking into account RAN capabilities or may be statically determined. Supporting a negotiation procedure can enable a RIC to work with different types of RAN implementations with different capabilities.

FIG. 4b illustrates an example of MPEM functionality split in which AI/ML approaches can be used in multiple stages of the reference model of the MPEM, according to one embodiment. More generally, in some embodiments, a MPEM module may also be embedded inside a network node, such as a base station, eNB or gNB, for example. Optimization algorithm applications may interact with the module via APIs towards the network node that allow interaction with the module.

Figure 5A:
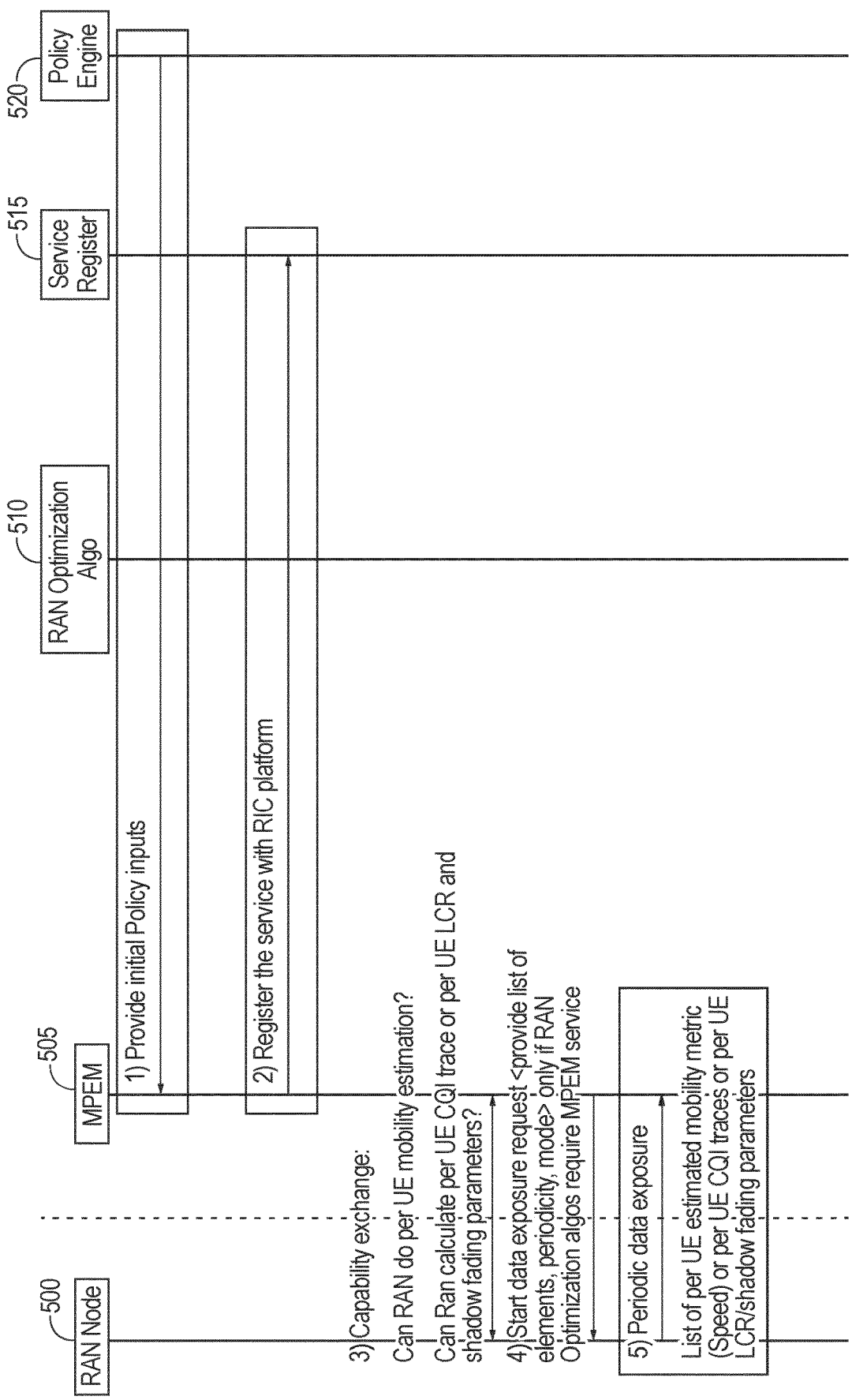
FIG. 5a illustrates an example message flow diagram, according to certain embodiments.
Figure 5B:
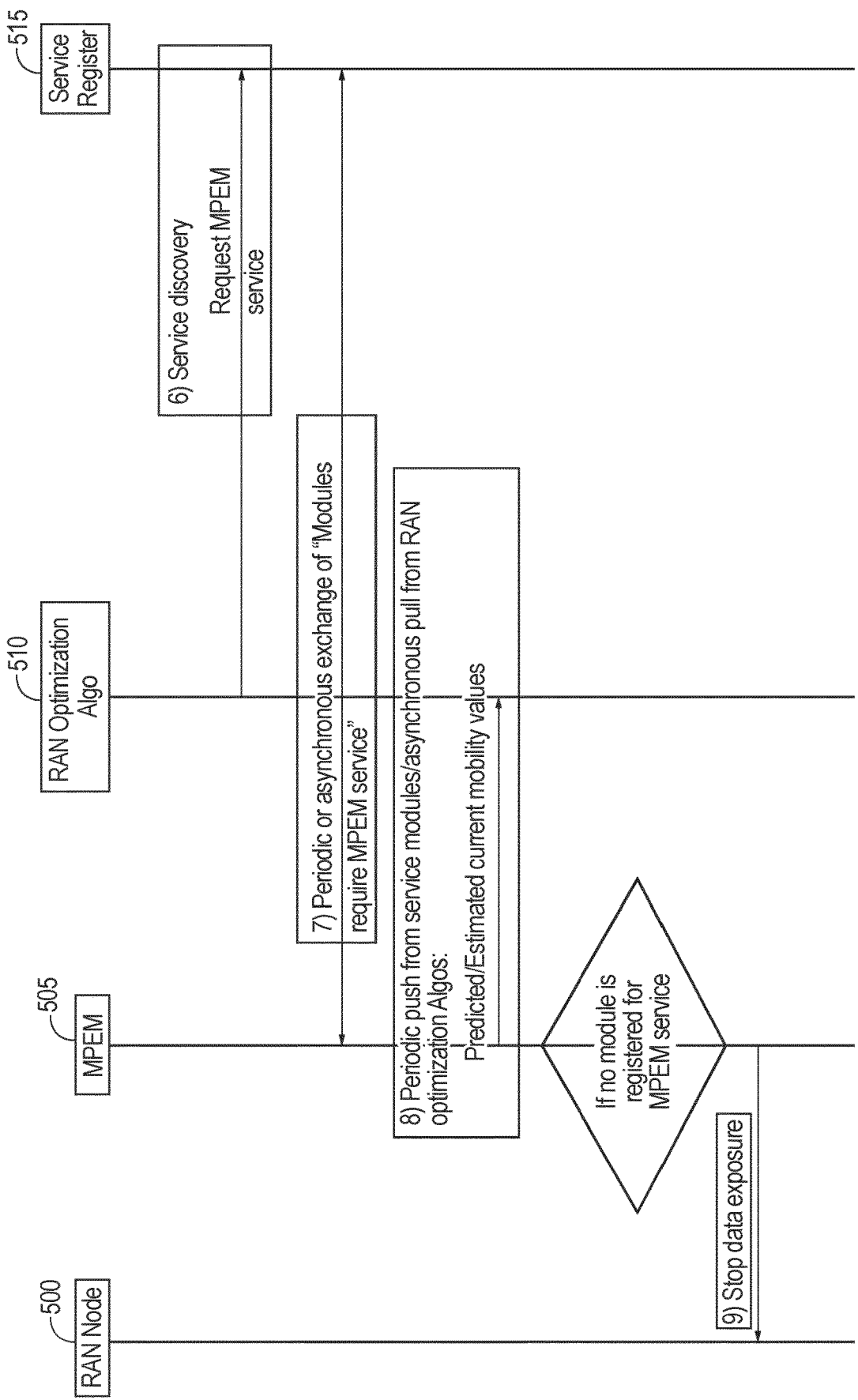
FIG. 5b illustrates an example message flow diagram, according to certain embodiments.

FIGS. 5a and 5b illustrate example message flow diagrams, according to certain embodiments. According to some example embodiments, as illustrated in FIG. 5a, a policy engine 520 may configure the policies in a MPEM 505. These policies may include, for example, one or more of: indications of which cells are to be handled by the MPEM 505; indications of which algorithms are allowed to request mobility metric estimations/predictions; biasing factors for certain cells/carriers; type of data RAN Node 500 is providing, such as LCR, shadow fading parameters, velocity estimated at RAN (e.g., using Doppler at physical layer); functionality split of mobility metric prediction/estimation module for each cell and method of mobility estimation; and/or mobility metric type, e.g., speed, channel coherence time, etc.

In an embodiment, as illustrated in FIG. 5a, the MPEM 505 may register as service providers with a service registry 515 and RAN specific optimization modules 510 may register themselves for MPEM services using service discovery APIs. According to some embodiments, the MPEM 505 may initiate the data collection if there are any modules requesting for its service, via messaging to the controller platform (facilitates data collection), from cells of interest at the corresponding time granularity using a data collection initiation API and then access collected data using a data access API to further process and select cells. It is noted that previously collected data from cells may be also accessed from the controller platform by the MPEM 505 using the data access API.

According to certain embodiments, the RAN node 500, based on the configured policy (policy can be based RANs processing/memory capability and network bandwidth constraints), may report data at a per-UE level or per-cell level aggregate. In some examples, the reported data may include one or more of CQI traces, LCR and shadow fading parameters, and/or estimated speed. In an embodiment, if the RAN node 500 reports CQI traces, then the MPEM 505 residing on RIC may calculate the LCR and shadow fading parameter.

In one embodiment, a 'per UE mobility metric estimation' component of the MPEM 505 may estimate a per UE mobility metric. In this case, the mobility metric may be channel coherence time. Based on the received per UE estimated mobility metric (e.g., coherence time or estimated speed at RAN), an 'aggregation and classification' component may calculate the mobility metrics for a cell that are suitably averaged/aggregated across all UEs, the classification of one or more UEs into multiple mobility metric classes/buckets (e.g., based on high/medium/low values of the mobility metric), and/or dominant (e.g., max or most prevalent) mobility metric values in a cell. According to some embodiments, the MPEM 505 may update and/or learn its time series prediction model based on the estimated mobility metrics.

According to certain embodiments, the MPEM 505 may receive, via an API, a request from a RAN/RRM optimization service to provide an estimate of the mobility metric of a given cell, along with additional attributes describing the characteristics of the requested mobility estimate. In some examples, the additional attributes may include, for instance, a type of mobility metric, a granularity of mobility metric estimate, a type of report (e.g., average or confidence bounds), whether the request is for estimate or future prediction, and/or a time interval over which the estimate/prediction should be valid. The type of mobility metric may include one or more of the speed of a UE in the cell, the channel coherence time or sojourn time of the UE in a cell, and/or rate of (or average time between) handovers. The granularity of mobility metric estimate may include one or more of a per-UE mobility metric or aggregated mobility metric (dominant mobility metric components, size of mobility metric buckets).

In some embodiments, the MPEM 505 may report the above-mentioned mobility metrics to registered RAN specific optimization modules 510 periodically, asynchronously, or as a reply to pull request. According to an embodiment, after the calculation, MPEM 505 may report the requested metric back to the requester. In certain embodiments, the reported value may be either a fixed number (e.g., channel coherence time in ms), or an upper or lower confidence interval.

Figure 6:
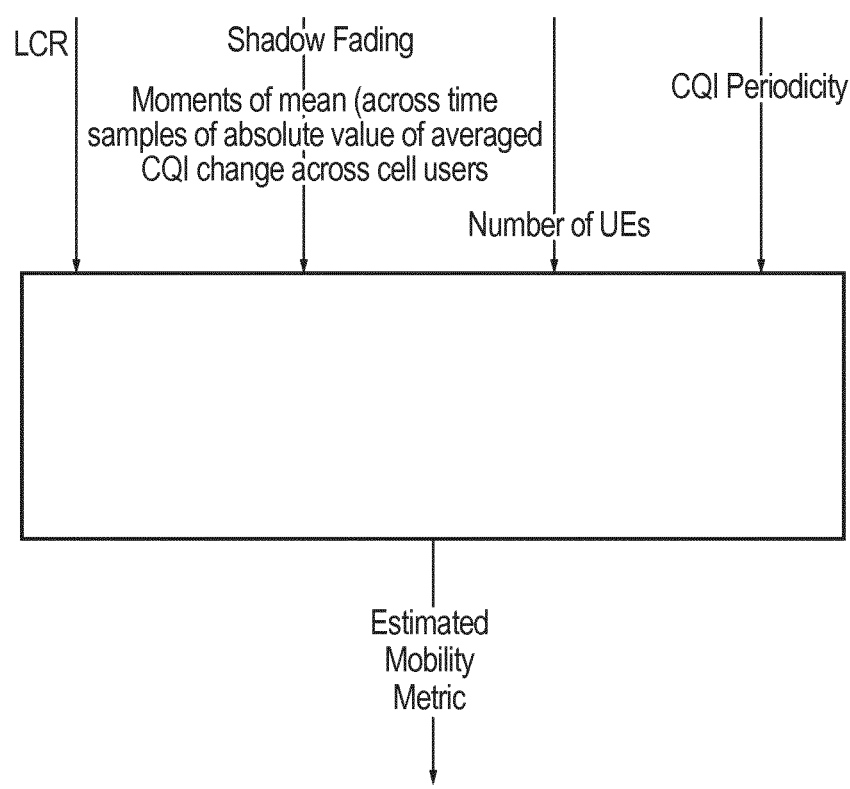
FIG. 6 illustrates an example block diagram depicting an example mobility metric estimation module, according to some embodiments.

FIG. 6 illustrates an example block diagram depicting an example UE mobility metric estimation module, according to some embodiments. In the example of FIG. 6, the UE mobility metric estimation may use fast fading and shadow fading parameters. Fast fading characteristics may be captured in LCR. According to an example embodiment, a neural network (NN) model may be used for estimating mobility and may take LCR, shadow fading parameters, and the number of connected UEs as inputs.

In some embodiments, LCR and Shadow fading may be calculated either in the RAN node or in RIC, based on processing constraints at the RAN node or bandwidth requirements. If LCR and shadow fading parameters are calculated in the RIC, then the RAN node may expose CQI traces to the RIC.

As introduced above, level crossing rate (LCR) describes how the channel changes with time. More specifically, level crossing rate may refer to a number of crossings (in the positive direction) of an input vector through a given threshold vector. The threshold may be normalized root mean square of the CQI trace of 80 ms window. A mobility metric (e.g., channel coherence time) may be proportional to both LCR and carrier wavelength.

Figure 7:
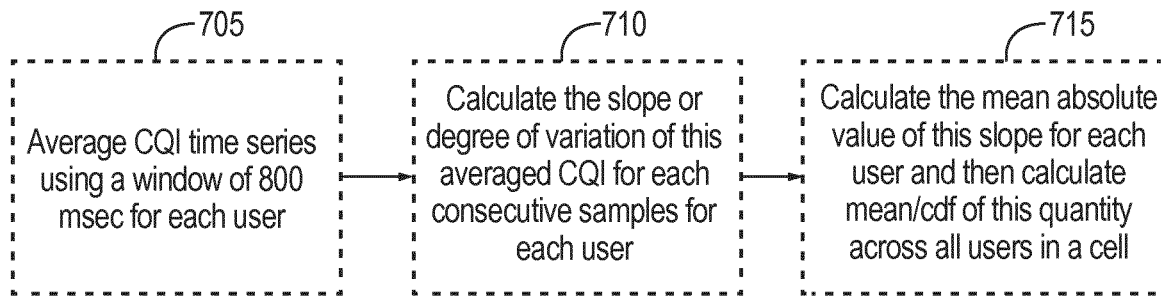
FIG. 7 illustrates an example flow diagram a method for determining shadow fading, according to an embodiment.

FIG. 7 illustrates an example flow diagram a method for determining shadow fading in which moments of mean (across time samples) of absolute value of averaged CQI change across cell users, according to one example. As illustrated in the example of FIG. 7, the method may include, at 705, averaging CQI time series using, for example, a window of 800 ms for each user. The method may then include, at 710, calculating the slope or degree of variation of the averaged CQI for each consecutive sample for each user and, at 715, calculating the mean absolute value of the slope for each user and then calculating mean/cdf of that quantity across all users in a cell.

According to certain embodiments, a mobility metric aggregation and classification component may receive a per-UE estimated mobility metric and calculate the mobility parameters according to the following. In an embodiment, the aggregation and classification component may classify the per-UE mobility metric into N buckets. For example, the estimated per-UE mobility metric may be classified into N groups using K means clustering. For each cluster mean, median and standard deviation may be calculated. In some examples, N can be 4, stationary, pedestrian, low vehicular mobility, high vehicular mobility, etc. In an embodiment, the aggregation and classification component may find the dominant mobility components. For example, using meanshift clustering, the estimated per-UE mobility metric may be classified into clusters. For each cluster mean, median and standard deviation along with percentage of UEs belong to that cluster may be calculated. One or more clusters which have higher percent of UEs and along with clusters mean, median, standard deviation may be reported. In an embodiment, the aggregation and classification component may determine a cell level mobility metric. For example, for estimated per-UE mobility metrics for all UEs in the cell, the following may be calculated: mean, median, standard deviation, and/or CDF.

According to some embodiments, the mobility metric may be predicted using time series. Mobility prediction is a time series prediction/estimation problem in which, based on the past time samples of the cell mobility metric and also additional features, such as event information (cell mobility could be high/less during an upcoming concert in region covered by the cell), in the cell of interest and also 'neighboring cells', cell mobility may be predicted or estimated. In an embodiment, mobility prediction may use ML or deep learning models and use estimated mobility metric data as an input to predict a mobility metric in advance of time steps. In some examples, mobility prediction may contain all or a combination of at least four-time series prediction/estimation model building blocks. These blocks may include a de-trending and de-seasonalization block to make the time series stationary and then an ARMA model can be fitted on the residual time series, a features block where additional features that the time series may depend on for mobility metric prediction, a RNN/LSTM based NN forecasting block for obtaining long term trends of mobility metric prediction, and a block for obtaining multiple mobility time series from neighboring cells as features.

According to some embodiments, mobility prediction may specify the neighbor cell relations (4) whose mobility time series can be used for mobility prediction for cell of interest, based on the ML/DL model used. As the mobility (time series) prediction model depends largely on the data, for example for data with an apparent trend, a a straightforward prediction model using de-trending approaches may work well. However, for data with difficult to predict spikes/dips, a more complicated prediction model using LSTM may be needed.

In certain embodiments, different ML/DL models may be used in the mobility prediction for different attributes requested. For example, based on the different prediction time length for which mobility metric prediction should be valid and also timescale, the mobility prediction may use a different ML/DL model as some models have a better autoregressive prediction characteristic than others. In addition, data characteristics at large time scale may not be similar compared to a more granular timescale, and different models may be needed. Also, prediction of a mobility metric may use a different ML/DL model. Therefore, based on the request attributes from the corresponding RRM optimization algorithm/service, a mobility prediction module may select a model to predict/estimate mobility.

According to some embodiments, the models in mobility prediction may be continuously updated using real time estimated mobility metrics. In principle, there may be different instances of MPEM, e.g., each handling different groups of cells. The MPEM may provide not just mobility metric prediction at cell level but may also be used at slice level across a single or multiple cells.

Figure 8:
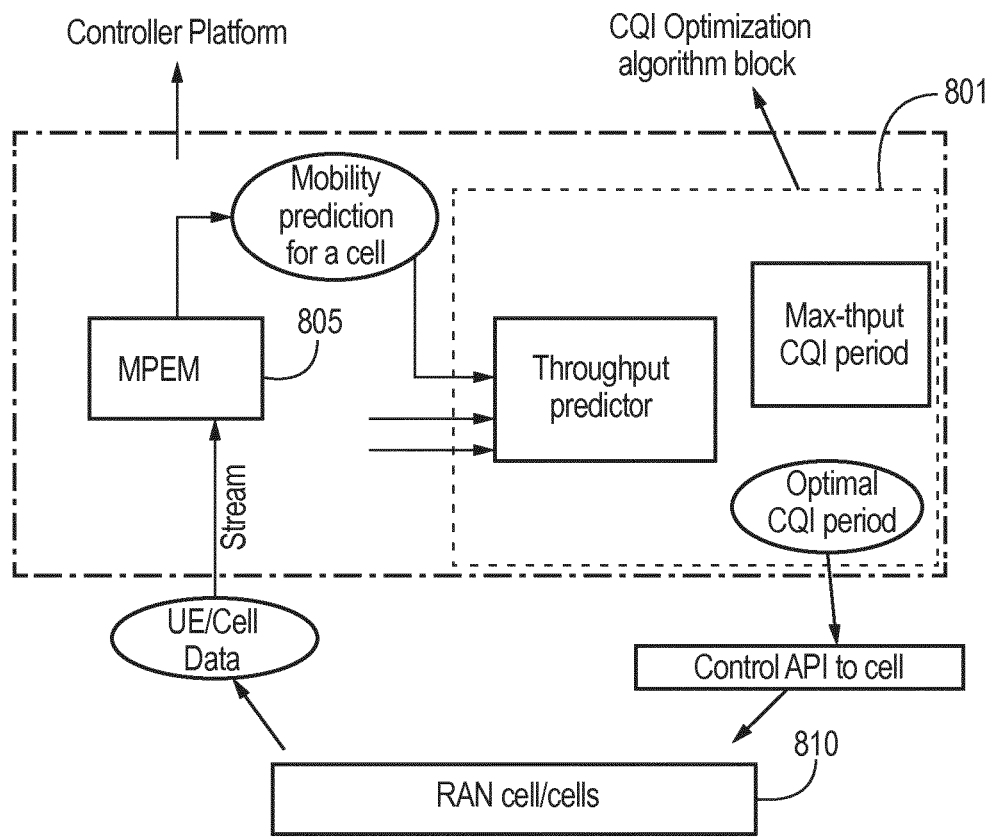
FIG. 8 illustrates an example block diagram of MPEM usage in a CQI optimization service, according to one embodiment.

FIG. 8 illustrates an example block diagram of MPEM usage in one of the RRM optimization services, a CQI optimization service 801. In the example of FIG. 8, for each incoming UE, RAN 810 may assign physical uplink control channel (PUCCH) resources (e.g. for reporting CQI, SR, etc.). The CQI optimization module 801 may be configured to dynamically optimize CQI reporting periodicity. This optimization requires mobility/velocity in a cell as one of the inputs to identify which CQI periodicity optimizes UL/DL throughput. Assuming the CQI optimization module 801 needs to predict what CQI periodicity will be optimal for a cell for next 15 minutes, it would require an estimate of mobility metric, i.e., mobility metric for next 15 minutes. In this example, the CQI optimization module 801 may request mobility metric prediction from MPEM 805 with a load attribute=mobility metric prediction for a cell, timescale=15 minutes, and prediction time step=1 (15 minutes), etc. Then, MPEM 805 may predict the mobility in the cell using periodic data it receives from the RAN 810 (also neighboring cells) and communicate that information to the CQI optimization module 801. The CQI optimization module 801 may then calculate the optimal CQI period and set the corresponding period using control API.

Figure 9:
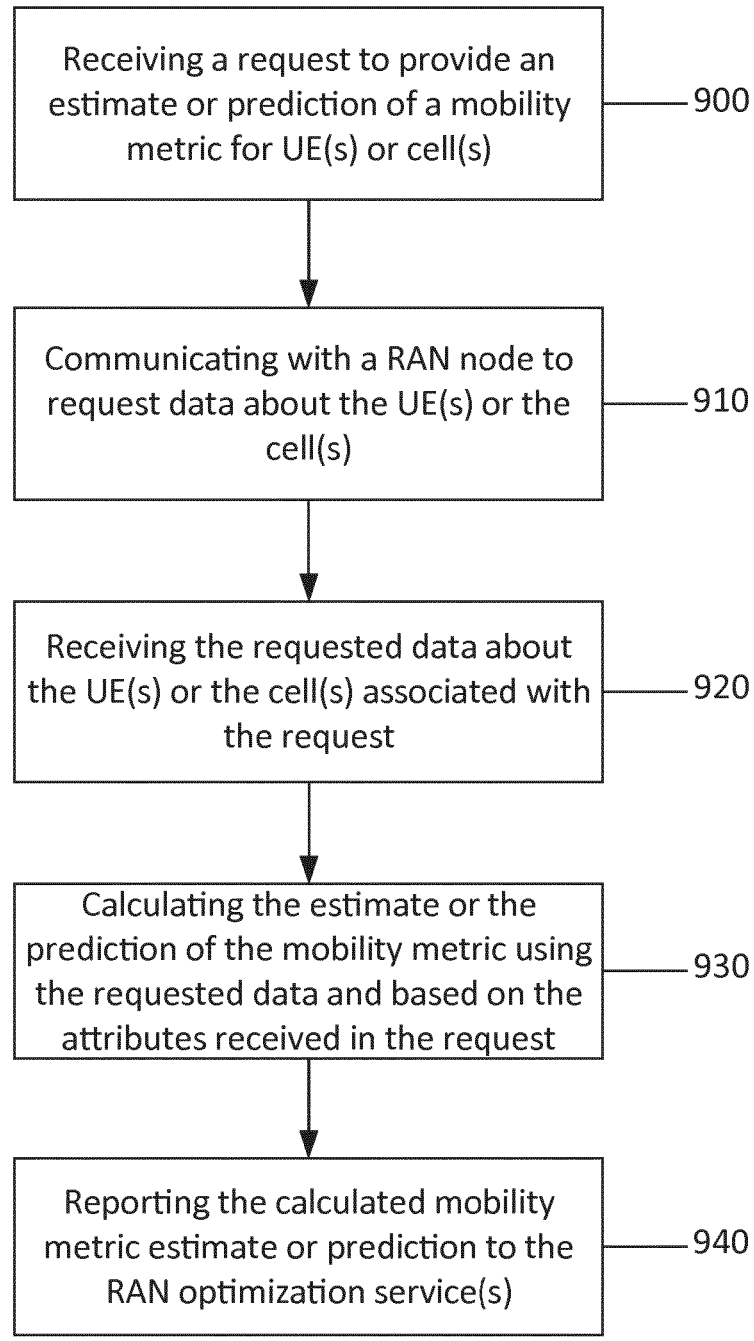
FIG. 9 illustrates an example flow diagram a method for estimating or predicting a mobility metric, according to one embodiment.

FIG. 9 illustrates an example flow diagram of a method for estimating or predicting a mobility metric, according to one example embodiment. In certain example embodiments, the flow diagram of FIG. 9 may be performed by a mobility metric estimation or prediction (MPEM) module or device.

According to an example embodiment, the MPEM device may be included in a network node, such as a base station, node B, eNB, gNB, or any other access node, or one or more servers in a 5GC or cloud configuration, for instance. In some example embodiments, the method of FIG. 9 may be performed by the MPEM illustrated in FIG. 2, 3, 5, 6 or 8, respectively. According to another example embodiment, the method of FIG. 9 may be performed by a RIC. In some examples, the RIC may reside partially in the RAN or completely outside the RAN, such as on a dedicated or cloud/virtual hardware.

As illustrated in the example of FIG. 9, the method may include, at 900, receiving a request, from at least one RAN optimization service, to provide an estimate or prediction of a mobility metric for at least one UE or at least one cell. In an embodiment, the request may include attributes describing the characteristics of the mobility metric. For example, the attributes describing the characteristics of the mobility metric may include a type of mobility metric (e.g., speed, channel coherence time or sojourn time of UE in a cell, rate of handovers, and/or average time between handovers), a granularity for the mobility metric estimate or prediction (e.g., per-UE mobility metric, or aggregated or averaged mobility metric), a type of report (e.g., average or confidence bounds), an indication of whether the request is for an estimate or future prediction, and/or a time interval over which the estimate or prediction is valid.

According to some embodiments, the method may also include, at 910, communicating with a RAN node, via a controller platform, to request data about the at least one UE or the at least one cell associated with the request received from the RAN optimization service. In certain embodiments, the requested data about the at least one UE or the at least one cell may include CQI values for the at least one UE, measures of rate variation of channel conditions of the at least one UE, and/or speed calculated at the RAN node.

In an embodiment, the method may then include, at 920, receiving the requested data about the at least one UE or the at least one cell associated with the request, and, at 930, calculating the estimate or the prediction of the mobility metric using the requested data and based on the attributes received in the request from the at least one RAN optimization service. According to some embodiments, the calculated mobility metric estimate or prediction may include a mobility metric estimate for an individual UE, a mobility metric estimate for the at least one cell averaged or aggregated across all UEs, a classification of the at least one UE into multiple mobility metric classes, dominant mobility metric values in the at least one cell, and/or an upper or lower range for the mobility metric estimate. In certain embodiments, the mobility metric estimate or prediction may be a per-UE mobility metric or a composite mobility metric for the at least one cell.

According to certain embodiments, the method may further include, at 940, reporting the calculated mobility metric estimate or prediction to the at least one RAN optimization service via an API. In some embodiments, the method may also include supporting an API to allow the at least one RAN optimization service to discover an identity or address of a mobility metric estimate and prediction module.

In one example embodiment, the method may also include receiving, via a policy API, an indication describing policies to be applied to the calculating of the mobility metric and the request from the at least one RAN optimization service. According to some embodiments, the indication describing the policies may include indications of which cells are to be handled by a mobility metric estimation and prediction module, indications of which RAN optimization service are allowed to request mobility metric estimations and predictions, biasing factors for certain cells or carriers, a type of data each cell is providing, and/or a functionality split of the mobility metric prediction and estimation module for each cell and method of mobility estimation.

Figure 10:
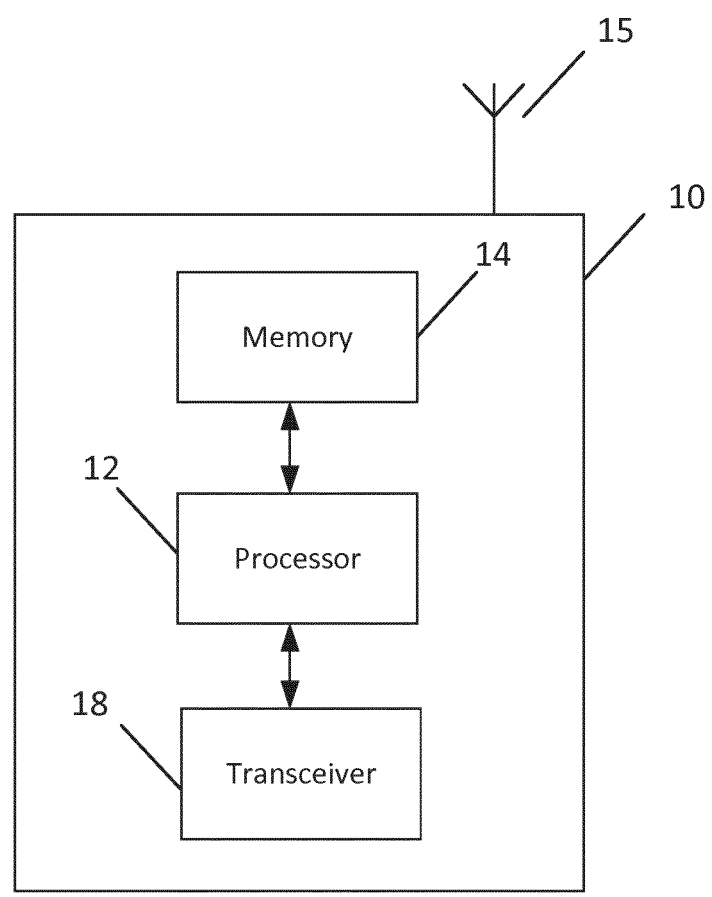
FIG. 10 illustrates an example block diagram of an apparatus, according to one embodiment.

FIG. 10 illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR or other radio systems which might benefit from an equivalent procedure. In one example embodiment, apparatus 10 may be or may include a MPEM device or module. According to another example embodiment, apparatus 10 may be a RIC or may be included in a RIC. In some examples, the RIC may reside partially in the RAN or completely outside the RAN, e.g., on a dedicated or cloud/virtual hardware. According to one example, data from RAN may be transferred over a backhaul (e.g., wired/wireless/optical).

Thus, it should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10.

As illustrated in the example of FIG. 10, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In further example embodiments, processor 12 may include a specialized processor or a ML/data analytics based application processor, such as a graphics processing unit (GPU) or tensor processing unit (TPU). In yet a further example, processor 12 may include a neural network or long short term memory (LSTM) architecture or hardware, etc.

While a single processor 12 is shown in FIG. 10, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, BT-LE, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with example embodiments.

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. For instance, in one example embodiment, memory 14 may store a MPEM module. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in example embodiments, apparatus 10 may be a network node or RAN node, such as a base station, access point, Node B, eNB, gNB, WLAN access point, or the like. In one example, apparatus 10 may be a gNB and/or CU-CP in a RRC layer. According to an example embodiment, apparatus 10 may be or may comprise a MPEM device or module. For instance, in one example embodiment, apparatus 10 may be or may be included in a RIC.

According to example embodiments, apparatus 10 may be controlled by memory 14 and processor 12 to perform the functions associated with any of the example embodiments described herein, such as the system or signaling flow diagrams illustrated in FIGS. 1-9. For example, in certain embodiments, apparatus 10 may be controlled by memory 14 and processor 12 to perform one or more of the steps performed by the MPEM in FIG. 5-7 or 9. In example embodiments, for instance, apparatus 10 may be configured to perform a process for estimating or predicting mobility metrics for a RAN optimization service.

For instance, in some example embodiments, apparatus 10 may be controlled by memory 14 and processor 12 to receive a request, from at least one RAN optimization service, to provide an estimate or prediction of a mobility metric for at least one UE or at least one cell. In an embodiment, the request may include attributes describing the characteristics of the mobility metric. For example, the attributes describing the characteristics of the mobility metric may include a type of mobility metric (e.g., speed, channel coherence time or sojourn time of UE in a cell, rate of handovers, and/or average time between handovers), a granularity for the mobility metric estimate or prediction (e.g., per-UE mobility metric, or aggregated or averaged mobility metric), a type of report (e.g., average or confidence bounds), an indication of whether the request is for an estimate or future prediction, and/or a time interval over which the estimate or prediction is valid.

According to some embodiments, apparatus 10 may be controlled by memory 14 and processor 12 to communicate with a RAN node, via a controller platform, to request data about the at least one UE or the at least one cell associated with the request received from the RAN optimization service. In certain embodiments, the requested data about the at least one UE or the at least one cell may include CQI values for the at least one UE, measures of rate variation of channel conditions of the at least one UE, and/or speed calculated at the RAN node.

In an embodiment, apparatus 10 may be controlled by memory 14 and processor 12 to receive the requested data about the at least one UE or the at least one cell associated with the request, and to calculate the estimate or the prediction of the mobility metric using the requested data and based on the attributes received in the request from the at least one RAN optimization service. According to some embodiments, the calculated mobility metric estimate or prediction may include a mobility metric estimate for an individual UE, a mobility metric estimate for the at least one cell averaged or aggregated across all UEs, a classification of the at least one UE into multiple mobility metric classes, dominant mobility metric values in the at least one cell, and/or an upper or lower range for the mobility metric estimate. In certain embodiments, the mobility metric estimate or prediction may be a per-UE mobility metric or a composite mobility metric for the at least one cell.

According to certain embodiments, apparatus 10 may be controlled by memory 14 and processor 12 to report the calculated mobility metric estimate or prediction to the at least one RAN optimization service via an API. In some embodiments, apparatus 10 may be controlled by memory 14 and processor 12 to support an API to allow the at least one RAN optimization service to discover an identity or address of a mobility metric estimate and prediction module.

In one example embodiment, apparatus 10 may be controlled by memory 14 and processor 12 to receive, via a policy API, an indication describing policies to be applied to the calculating of the mobility metric and the request from the at least one RAN optimization service. According to some embodiments, the indication describing the policies may include indications of which cells are to be handled by a mobility metric estimation and prediction module, indications of which RAN optimization service are allowed to request mobility metric estimations and predictions, biasing factors for certain cells or carriers, a type of data each cell is providing, and/or a functionality split of the mobility metric prediction and estimation module for each cell and method of mobility estimation.

Therefore, certain example embodiments provide several technical improvements, enhancements, and/or advantages. Various example embodiments can, for example, allow different RRM/optimization algorithms or services to be able to obtain mobility metrics with the correct characteristics as need by that algorithm/service in flexible and programmable way. Additionally, example embodiments minimize data duplication and processor overhead since data from the RAN node needs only to be sent to the mobility metric estimation module and does not have to be individually sent to each RRM/optimization algorithms or services that needs to calculate some measure of load. Further, example embodiments may provide APIs designed to be suitable to implement over a controller platform, such as a RIC. Service-discovery APIs allow any RRM/optimization algorithm/service to discover the mobility metric estimation module.

Consequently, certain example embodiments may improve network performance and network energy efficiency. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. An apparatus, comprising:
   at least one processor; and
   at least one non-transitory memory comprising computer program code,
   the at least one memory and computer program code configured, with the at least one processor, to cause the apparatus at least to:
   receive a request, from at least one radio access network optimization service, to provide an estimate or prediction of a mobility metric for at least one user equipment or group of user equipments or at least one cell, the request comprising attributes describing characteristics of the mobility metric;
   communicate with a radio access network node, via a controller platform, to request data about the at least one user equipment or the group of user equipments or the at least one cell associated with the request;
   receive the requested data about the at least one user equipment or the group of user equipments or the at least one cell associated with the request; and
   calculate the estimate or the prediction of the mobility metric using the requested data and based on the attributes received in the request from the at least one radio access network optimization service.

2. The apparatus according to claim 1, wherein the at least one memory and computer program code are further configured, with the at least one processor, to cause the apparatus at least to:
   report the calculated mobility metric estimate or prediction to the at least one radio access network optimization service via an application programming interface.

3. The apparatus according to claim 1, wherein the mobility metric comprises at least one of:
   a user equipment speed,
   channel coherence time,
   sojourn time of a user equipment in a cell, or
   rate or average time between handovers.

4. The apparatus according to claim 1, wherein the calculated mobility metric estimate or prediction comprises at least one of:
   a mobility metric estimate for an individual user equipment;
   a mobility metric estimate for the at least one cell averaged or aggregated across all user equipment;
   a classification of the at least one user equipment into multiple mobility metric classes;
   dominant mobility metric values in the at least one cell;
   at least one of an upper or lower range for the mobility metric estimate;
   an average metric value over a user equipment group;
   a maximum metric value over the at least one user equipment; or
   a percentile of metric value the user equipment group.

5. The apparatus according to claim 1, wherein the mobility metric estimate or prediction comprises a per-user equipment mobility metric or a composite mobility metric for the at least one cell.

6. The apparatus according to claim 1, wherein the attributes comprise at least one of:
   a type of mobility metric;
   a granularity for the mobility metric estimate;
   a type of report;
   an indication of whether the request is for an estimate or future prediction; or
   a time interval over which the estimate or prediction is valid.

7. The apparatus according to claim 1, wherein the requested data about the at least one user equipment or the group of user equipments or the at least one cell comprises at least one of:
   channel quality indicator values for the at least one user equipment;
   measures of rate variation of channel conditions of the at least one user equipment;
   speed calculated at the radio access network node;
   level crossing rate; or
   shadow fading parameter.

8. The apparatus according to claim 1, wherein the at least one memory and computer program code are further configured, with the at least one processor, to cause the apparatus at least to:
   support an application programming interface to allow the at least one radio access network optimization service to discover an identity or address of a mobility metric estimate and prediction module.

9. The apparatus according to claim 1, wherein the at least one memory and computer program code are further configured, with the at least one processor, to cause the apparatus at least to:
   receive, via a policy application programming interface, an indication describing policies to be applied to the calculating of the mobility metric and the request from the at least one radio access network optimization service.

10. The apparatus according to claim 9, wherein the indication describing the policies comprises at least one of:
    indications of which cells are to be handled by a mobility metric estimation and prediction module;
    indications of which radio access network optimization service are allowed to request mobility metric estimations and predictions;
    biasing factors for certain cells or carriers;
    a type of data each cell is providing; or
    functionality split of the mobility metric prediction and estimation module for each cell and method of mobility estimation.

11. The apparatus according to claim 1, wherein information exchanged between the radio access network and a radio intelligent controller depends on a functional split of the mobility metric prediction and estimation module between the radio access network and the radio intelligent controller.

12. An apparatus, comprising:
    circuitry configured to receive a request, from at least one radio access network optimization service, to provide an estimate or prediction of a mobility metric for at least one user equipment or a group of user equipments or at least one cell, the request comprising attributes describing characteristics of the mobility metric;

circuitry configured to communicate with a radio access network node, via a controller platform, to request data about the at least one user equipment or the group of user equipments or the at least one cell associated with the request;

circuitry configured to receive the requested data about the at least one user equipment or the group of user equipments or the at least one cell associated with the request; and circuitry configured to calculate the estimate or the prediction of the mobility metric using the requested data and based on the attributes received in the request from the at least one radio access network optimization service.

13. A method, comprising:

receiving a request, from at least one radio access network optimization service, to provide an estimate or prediction of a mobility metric for at least one user equipment or a group of user equipments or at least one cell, the request comprising attributes describing characteristics of the mobility metric;

communicating with a radio access network node, via a controller platform, to request data about the at least one user equipment or the group of user equipments or the at least one cell associated with the request;

receiving the requested data about the at least one user equipment or the group of user equipments or the at least one cell associated with the request; and calculating the estimate or the prediction of the mobility metric using the requested data and based on the attributes received in the request from the at least one radio access network optimization service.

14. The method according to claim 13, further comprising:

reporting the calculated mobility metric estimate or prediction to the at least one radio access network optimization service via an application programming interface.

15. The method according to claim 13, wherein the mobility metric comprises at least one of:

a user equipment speed,
channel coherence time,
sojourn time of a user equipment in a cell, or
rate or average time between handovers.

16. The method according to claim 13, wherein the calculated mobility metric estimate or prediction comprises at least one of:

a mobility metric estimate for an individual user equipment;
a mobility metric estimate for the at least one cell averaged or aggregated across all user equipment;
a classification of the at least one user equipment into multiple mobility metric classes;
dominant mobility metric values in the at least one cell;
at least one of an upper range or a lower range for the mobility metric estimate;
an average metric value over a user equipment group;
a maximum metric value over the at least one user equipment; or
a percentile of metric value the user equipment group.

17. The method according to claim 13, wherein the mobility metric estimate or prediction comprises a per-user equipment mobility metric or a composite mobility metric for the at least one cell.

18. The method according to claim 13, wherein the attributes comprise at least one of:

a type of mobility metric;
a granularity for the mobility metric estimate;
a type of report;
an indication of whether the request is for an estimate or future prediction; or
a time interval over which the estimate or prediction is valid.

19. The method according to claim 13, wherein the requested data about the at least one user equipment or the group of user equipments or the at least one cell comprises at least one of:

channel quality indicator values for the at least one user equipment;
measures of rate variation of channel conditions of the at least one user equipment;
speed calculated at the radio access network node;
level crossing rate; or
shadow fading parameter.

20. The method according to claim 13, further comprising:

supporting an application programming interface to allow the at least one radio access network optimization service to discover an identity or address of a mobility metric estimate and prediction module.

* * * * *